United States Patent
Robinson

(10) Patent No.: US 11,180,360 B2
(45) Date of Patent: Nov. 23, 2021

(54) EQUINE SAFETY DEVICE

(71) Applicant: Susan Robinson, Jurupa Valley, CA (US)

(72) Inventor: Susan Robinson, Jurupa Valley, CA (US)

(*) Notice: Subject to any disclaimer, the term of this patent is extended or adjusted under 35 U.S.C. 154(b) by 176 days.

(21) Appl. No.: 16/660,454

(22) Filed: Oct. 22, 2019

(65) Prior Publication Data
US 2021/0114863 A1 Apr. 22, 2021

(51) Int. Cl.
*G02B 5/12* (2006.01)
*B68B 7/00* (2006.01)
*G02B 7/182* (2021.01)

(52) U.S. Cl.
CPC .............. *B68B 7/00* (2013.01); *G02B 5/12* (2013.01); *G02B 7/182* (2013.01)

(58) Field of Classification Search
CPC .............. B68B 7/00; G02B 5/12; G02B 7/182
USPC .......................................... 359/516
See application file for complete search history.

(56) References Cited

U.S. PATENT DOCUMENTS

| | | |
|---|---|---|
| D312,590 S | 12/1990 | Kagayama |
| 6,302,554 B1 * | 10/2001 | Holce ............... A45D 8/00 340/573.3 |
| 6,574,948 B2 | 6/2003 | Longtin |
| 7,431,471 B1 | 10/2008 | Wade |
| 8,240,869 B2 | 8/2012 | Johnson |
| 8,662,682 B2 | 3/2014 | Gorodisher |
| 10,071,901 B2 | 9/2018 | Gros |
| 2004/0244342 A1 | 12/2004 | Grogoza |
| 2017/0029266 A1 | 2/2017 | Statam |

FOREIGN PATENT DOCUMENTS

WO WO2014124343 8/2014

* cited by examiner

*Primary Examiner* — Euncha P Cherry

(57) ABSTRACT

An equine safety device for reducing risk of a vehicle-horse collision includes a set of safety reflectors. Each safety reflector is selectively couplable to at least one of hair of a tail of a horse and hair of a forelock of the horse. The set of safety reflectors is configured to enhance visibility of the horse to an operator of vehicle via light from headlights of the vehicle being reflected back to the operator.

9 Claims, 5 Drawing Sheets

EQUINE SAFETY DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to safety devices and more particularly pertains to a new safety device for reducing risk of a vehicle-horse collision.

(2) Description of Related Art Including Information Disclosed Under 37 CFR 1.97 and 1.98

The prior art relates to safety devices.

(h) BRIEF SUMMARY OF THE INVENTION

An embodiment of the disclosure meets the needs presented above by generally comprising a set of safety reflectors. Each safety reflector is selectively couplable to at least one of hair of a tail of a horse and hair of a forelock of the horse. The set of safety reflectors is configured to enhance visibility of the horse to an operator of vehicle via light from headlights of the vehicle being reflected back to the operator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
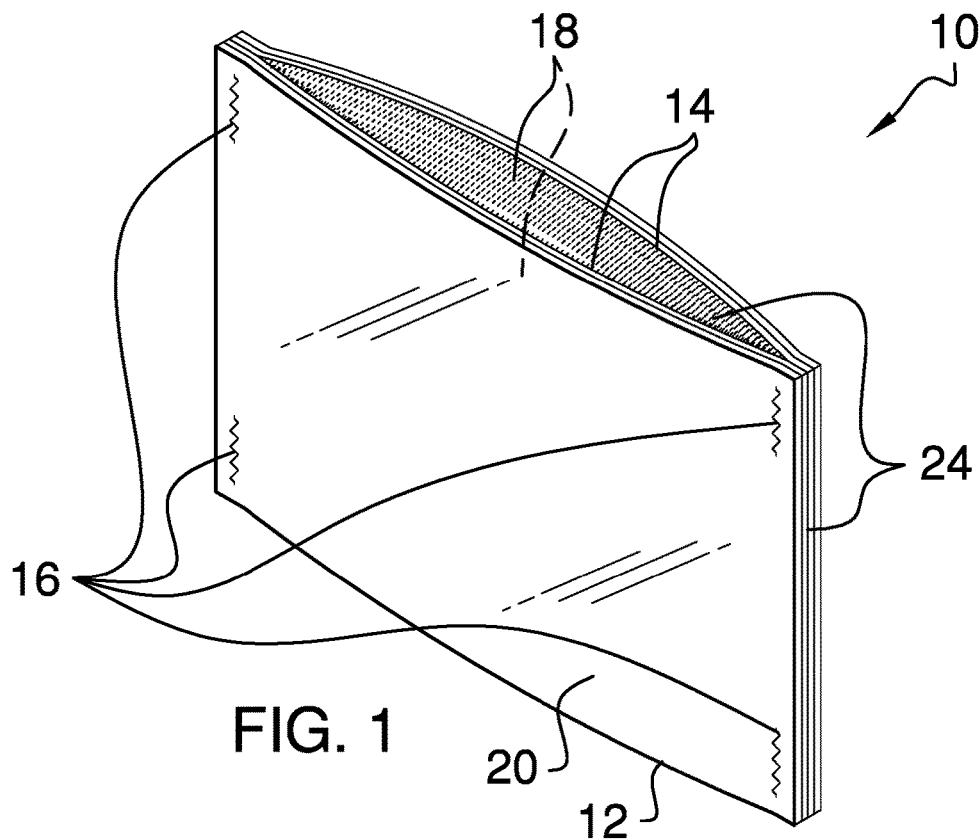
FIG. 1 is an isometric perspective view of an equine safety device according to an embodiment of the disclosure.
Figure 2:
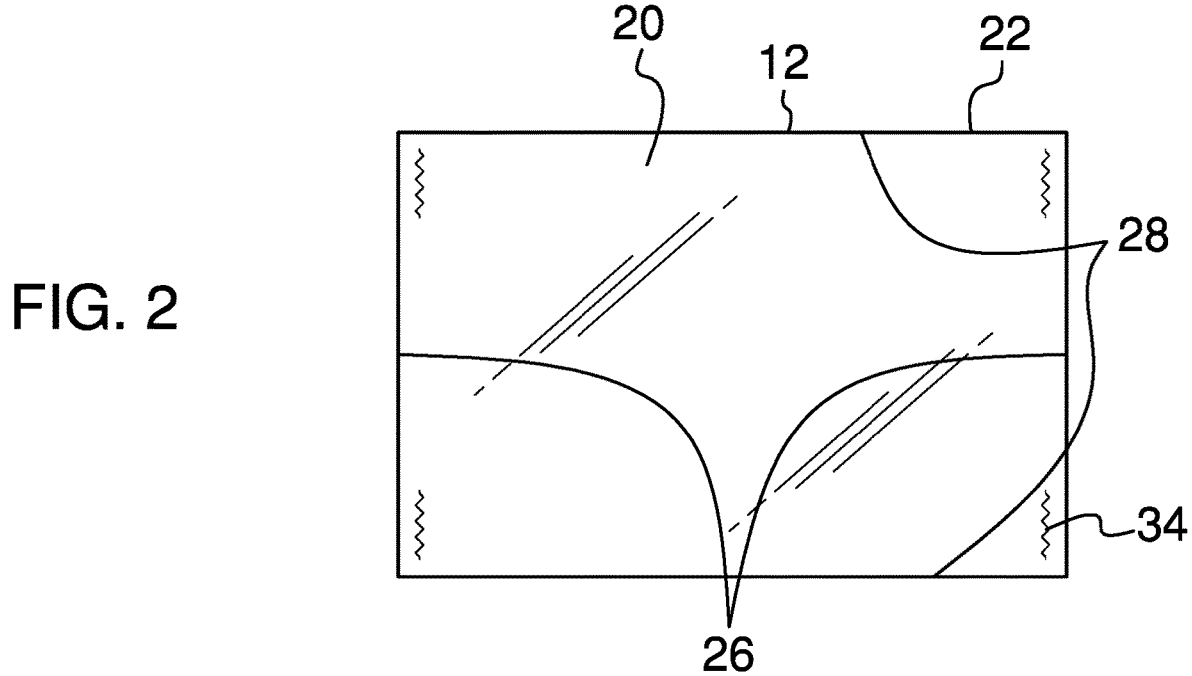
FIG. 2 is a back view of an embodiment of the disclosure.

With reference now to the drawings, and in particular to FIGS. 1 through 6 thereof, a new safety device embodying the principles and concepts of an embodiment of the disclosure and generally designated by the reference numeral 10 will be described.

Figure 5:
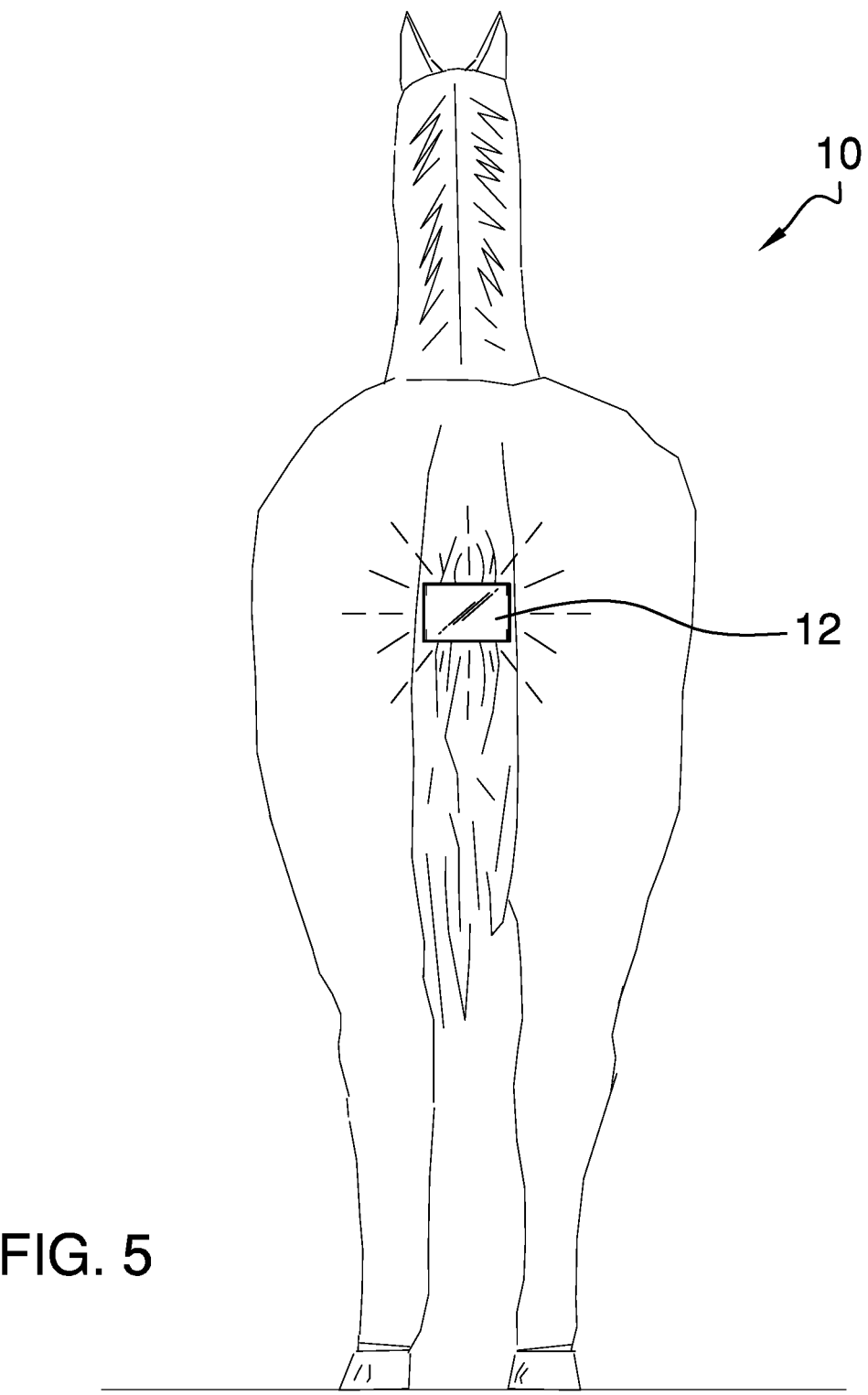
FIG. 5 is an in-use view of an embodiment of the disclosure.
Figure 6:
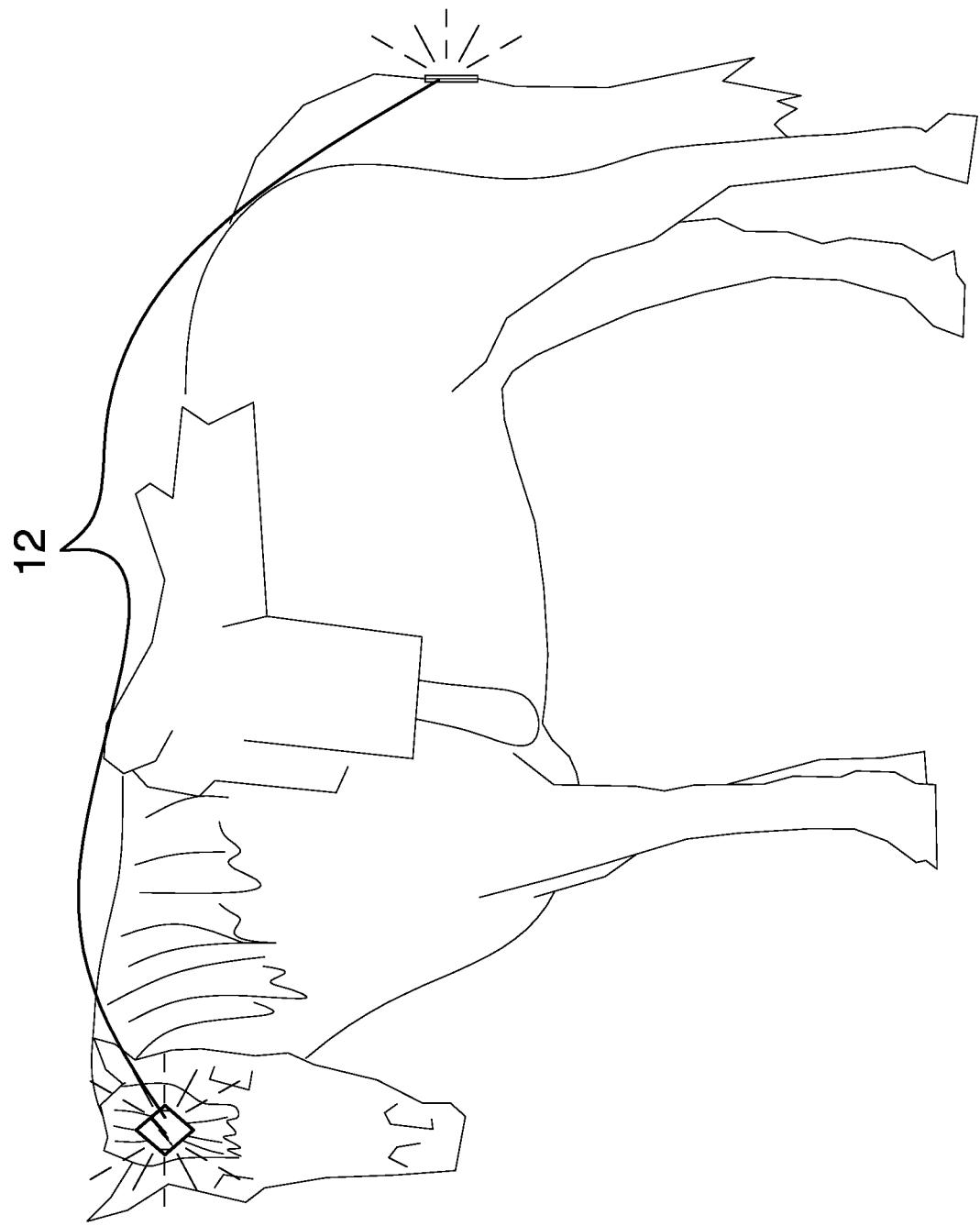
FIG. 6 is an in-use view of an embodiment of the disclosure.

As best illustrated in FIGS. 1 through 6, the equine safety device 10 generally comprises a set of safety reflectors 12. Each safety reflector 12 is selectively couplable to at least one of hair of a tail of a horse and hair of a forelock of the horse, as shown in FIGS. 5 and 6. The set of safety reflectors 12 is configured to enhance visibility of the horse to an operator of vehicle via light from headlights of the vehicle being reflected back to the operator.

Each safety reflector 12 comprises a pair of panels 14, which are flexible, a set of connectors 16, a set of fasteners 18, and a set of retroreflectors 20. Each connector 16 is coupled to and extends between the panels 14 of the pair of panels 14 proximate to a perimeter 22 of the pair of panels 14 to define a set of slits 24 in the perimeter 22. A respective pair of slits 24 is configured to be opened as the pair of panels 14 is separated, positioning the respective pair of slits 24 to insert a lock of the hair of the horse between the panels 14. In the case of a rectangularly shaped panel 14, as shown in FIG. 1, the respective pair of slits 24 is opened by pushing together either opposing ends 26 or opposing sides 28 of the pair of panels 14.

Each fastener 18 is coupled to an inside face 30 of a respective panel 14. The fastener 18 is configured to removably couple to the lock of hair of the horse to couple the pair of panels 14 to the lock of hair of the horse.

Each retroreflector 20 is coupled to an outside face 32 of a respective panel 14. The retroreflector 20 is configured to enhance the visibility of the horse to the operator of the vehicle via the light from the headlights of the vehicle being reflected back to the operator.

The perimeter 22 is at least one of trapezoidally shaped, rectangularly shaped, as shown in FIGS. 1-5, squarely shaped, diamond shaped, as shown in FIG. 6, trigonally shaped, circularly shaped, and ovally shaped.

Each connector 16 may comprise a set of stitches 34, or other fastening means, such as, but not limited to, glues, buttons, snap fastener, and the like.

Figure 3:
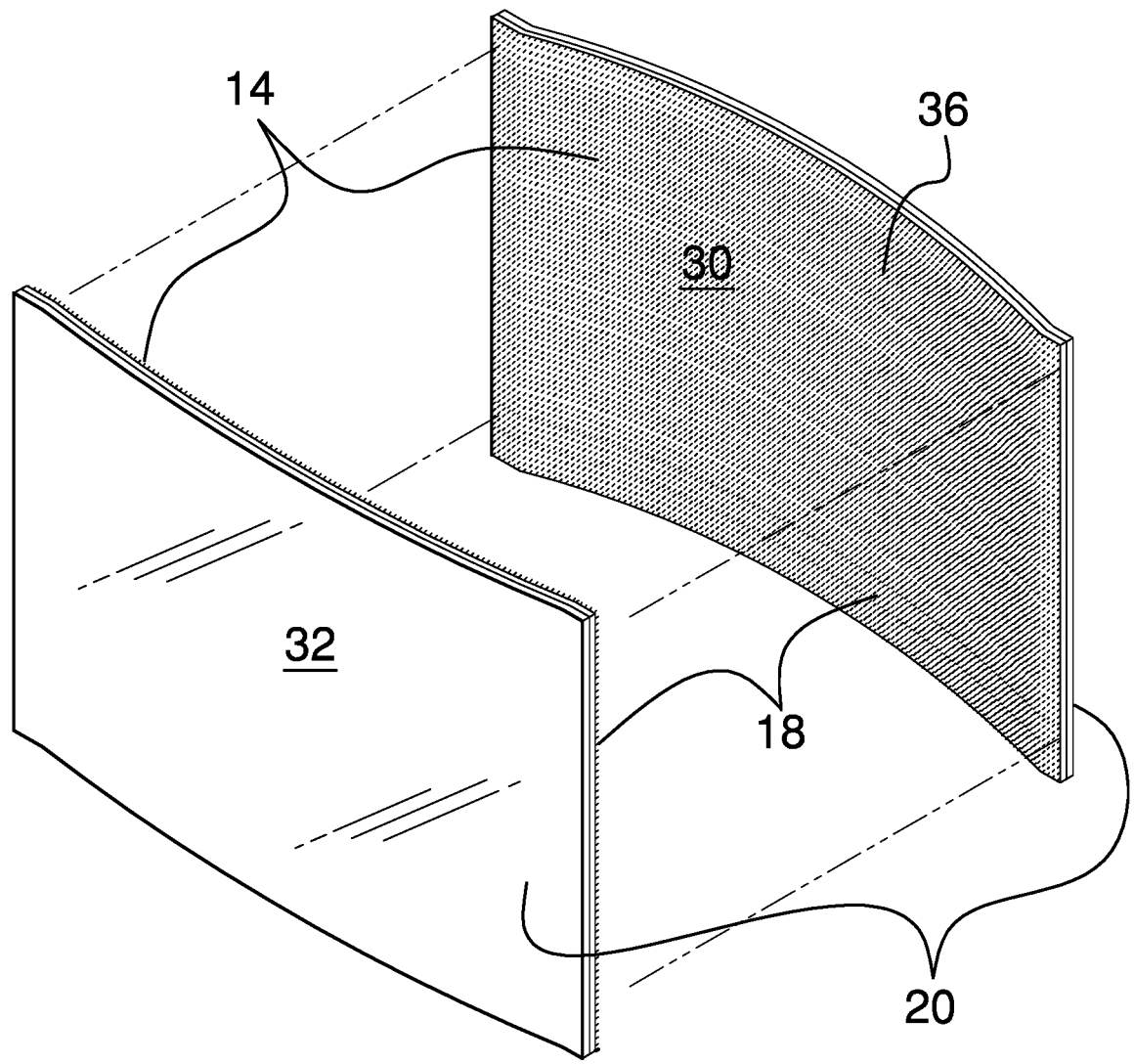
FIG. 3 is an exploded view of an embodiment of the disclosure.
Figure 4:
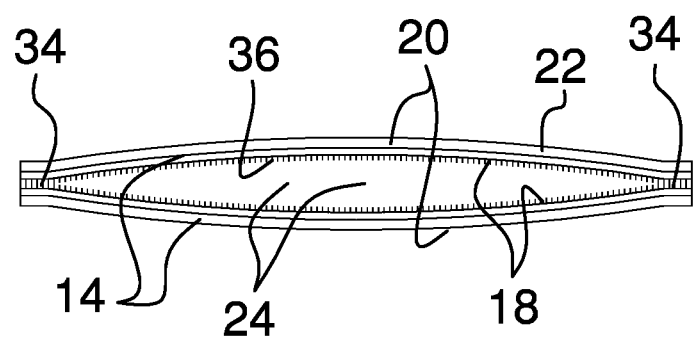
FIG. 4 is a bottom view of an embodiment of the disclosure.

The fastener 18 may comprise a hooking element of a hook and loop fastener 36, or other fastening means, such as, but not limited to, pressure sensitive adhesives, clips, and the like. The fastener 18 may be sized substantially complementarily to the inside face 30 of the respective panel 14, as shown in FIG. 3. The set of fasteners 18 may comprise two fasteners 18 that are coupled singly to the panels 14.

The retroreflector 20 may be sized substantially complementarily to the outside face 32 of the respective panel 14, as shown in FIG. 3. The set of retroreflectors 20 may comprise two retroreflectors 20 that are coupled singly to the panels 14. Having two retroreflectors 20 coupled singly to the panels 14 is advantageous when the safety reflector 12 is coupled to the hair of the tail of the horse as one of the retroreflectors 20 is visible when the tail is raised and the other of the retroreflectors 20 is visible when the tail is lowered.

In use, the safety reflector 12 is coupled to the hair of a tail of the horse or to the hair of the forelock of the horse by separating the panels 14 of the pair of panels 14 and inserting a lock of hair between the panels 14. The panels 14 then are pushed together so that the hooking elements 36 couple to the lock of hair and fixedly couple the safety reflector 12 to the lock of hair. The safety reflector 12 reflects the light from headlights of the vehicle back to the operator to enhance the visibility of the horse to the operator.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An equine safety device comprising:
a set of safety reflectors, each safety reflector being selectively couplable to at least one of hair of a tail of a horse and hair of a forelock of the horse wherein the set of safety reflectors is configured for enhancing visibility of the horse to an operator of vehicle via light from headlights of the vehicle being reflected back to the operator; and
each safety reflector comprising:
a pair of panels, the panels being flexible;
a set of connectors, each connector being coupled to and extending between the panels of the pair of panels proximate to a perimeter of the pair of panels defining a set of slits in the perimeter wherein a respective pair of slits is configured for opening as the pair of panels is separated positioning the respective pair of slits for inserting a lock of the hair of the horse between the panels;
a set of fasteners, each fastener being coupled to an inside face of a respective panel wherein the fastener is configured for removably coupling to the lock of hair of the horse for coupling the pair of panels to the lock of hair of the horse; and
a set of retroreflectors, each retroreflector being coupled to an outside face of a respective panel wherein the retroreflector is configured for enhancing the visibility of the horse to the operator of the vehicle via the light from the headlights of the vehicle being reflected back to the operator.

2. The device of claim 1, further including the perimeter being at least one of trapezoidally shaped, rectangularly shaped, squarely shaped, diamond shaped, trigonally shaped, circularly shaped, and ovally shaped.

3. The device of claim 1, further including each connector comprising a set of stiches.

4. The device of claim 1, further including the fastener comprising a hooking element of a hook and loop fastener.

5. The device of claim 1, further including the fastener being sized substantially complementarily to the inside face of the respective panel.

6. The device of claim 1, further including the set of fasteners comprising two fasteners coupled singly to the panels.

7. The device of claim 1, further including the retroreflector being sized substantially complementarily to the outside face of the respective panel.

8. The device of claim 1, further including the set of retroreflectors comprising two retroreflectors coupled singly to the panels.

9. An equine safety device comprising:
a set of safety reflectors, each safety reflector being selectively couplable to at least one of hair of a tail of a horse and hair of a forelock of the horse wherein the set of safety reflectors is configured for enhancing visibility of the horse to an operator of vehicle via light from headlights of the vehicle being reflected back to the operator, each safety reflector comprising:
a pair of panels, the panels being flexible,
a set of connectors, each connector being coupled to and extending between the panels of the pair of panels proximate to a perimeter of the pair of panels defining a set of slits in the perimeter wherein a respective pair of slits is configured for opening as the pair of panels is separated positioning the respective pair of slits for inserting a lock of the hair of the horse between the panels, the perimeter being at least one of trapezoidally shaped, rectangularly shaped, squarely shaped, diamond shaped, trigonally shaped, circularly shaped, and ovally shaped, each connector comprising a set of stiches,
a set of fasteners, each fastener being coupled to an inside face of a respective panel wherein the fastener is configured for removably coupling to the lock of hair of the horse for coupling the pair of panels to the lock of hair of the horse, the fastener comprising a hooking element of a hook and loop fastener, the fastener being sized substantially complementarily to the inside face of the respective panel, the set of fasteners comprising two fasteners coupled singly to the panels, and
a set of retroreflectors, each retroreflector being coupled to an outside face of a respective panel wherein the retroreflector is configured for enhancing the visibility of the horse to the operator of the vehicle via the light from the headlights of the vehicle being reflected back to the operator, the retroreflector being sized substantially complementarily to the outside face of the respective panel, the set of retroreflectors comprising two retroreflectors coupled singly to the panels.

* * * * *